United States Patent
Liao et al.

(10) Patent No.: US 11,421,105 B2
(45) Date of Patent: *Aug. 23, 2022

(54) LOW SPECIFIC GRAVITY PET COMPOSITE MATERIAL

(71) Applicant: NAN YA PLASTICS CORPORATION, Taipei (TW)

(72) Inventors: Te-Chao Liao, Taipei (TW); Han-Ching Hsu, Taipei (TW); Kai-Chih Lei, Taipei (TW); Chun-Lai Chen, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 66 days.

This patent is subject to a terminal disclaimer.

(21) Appl. No.: 16/679,420

(22) Filed: Nov. 11, 2019

(65) Prior Publication Data

US 2020/0239683 A1 Jul. 30, 2020

(30) Foreign Application Priority Data

Jan. 30, 2019 (TW) ................................ 108103610

(51) Int. Cl.
*C08L 67/02* (2006.01)

(52) U.S. Cl.
CPC ........... *C08L 67/02* (2013.01); *C08L 2201/08* (2013.01); *C08L 2205/025* (2013.01); *C08L 2205/03* (2013.01); *C08L 2205/06* (2013.01); *C08L 2205/24* (2013.01)

(58) Field of Classification Search
CPC .............. C08L 67/02; C08L 2201/08; C08L 2205/025; C08L 2205/06; C08L 2205/24
See application file for complete search history.

(56) References Cited

U.S. PATENT DOCUMENTS

| | | | |
|---|---|---|---|
| 5,149,734 A | 9/1992 | Fisher et al. | |
| 6,355,319 B1 * | 3/2002 | Nakamachi | C08L 67/02 428/35.7 |
| 2006/0009556 A1 | 1/2006 | Lu | |
| 2020/0199353 A1 * | 6/2020 | Liao | C08J 3/203 |
| 2020/0339777 A1 * | 10/2020 | Liao | C08K 3/36 |

FOREIGN PATENT DOCUMENTS

| | | | |
|---|---|---|---|
| CN | 102492276 A | | 6/2012 |
| CN | 102719060 A | | 10/2012 |
| CN | 102719060 B | * | 6/2014 |
| CN | 105273370 A | | 1/2016 |
| JP | 2001200147 A | | 7/2001 |
| JP | 200515677 A | | 1/2005 |
| JP | 2009155490 A | | 7/2009 |
| JP | 2010150484 A | | 7/2010 |
| JP | 2013529713 A | | 7/2013 |
| JP | 201887025 A | | 6/2018 |

OTHER PUBLICATIONS

English-language machine translation of CN102719060, performed on Espacenet on Jun. 3, 2021, 10 pages.*
Charles Tanford, "Intrinsic Viscosity and Kinematic Viscosity," 59 J. Phys. Chem. 798 (1955).*
William L. Hergenrother & Charles Jay Nelson, "Viscosity-Molecular Weight Relationship for Fractionated Poly(Ethylene Terephthalate)," 12 Journal of Polymer Science: Polymer Chemistry Edition 2905 (1974).*
W.F.H. Borman, "Molecular Weight-Viscosity Relationships for Poly(1,3-Butylene Terephthalate)," 22 Journal of Applied Polymer Science 2119 (1978).*
Yang Mingshan, "Practical technology and application of plastics"; Dec. 31, 2014; Cultural Development Publishing House; pp. 198-199.
Zhu Hongfa, "Industrial Additives Brochure"; Dec. 31, 2007; Jindun Publishing House; p. 56.
Wang Wenguang, "Principle of polymer modification (General Higher Education Undergraduate Planning Textbook)"; Dec. 31, 2018; China Light Industry Press; pp. 76-77.

* cited by examiner

*Primary Examiner* — Nicholas E Hill
(74) *Attorney, Agent, or Firm* — Li & Cai Intellectual Property (USA) Office

(57) ABSTRACT

A use of a low specific gravity PET composite material that is suitable for manufacturing a tableware article by injection molding is provided. The tableware article provides a balance between aesthetic appearance and food safety and can be used in place of melamine tableware. The low specific gravity PET composite material includes 66.5-96.3 wt % of PET, 0-20 wt % of PBT, 3-10 wt % of an inorganic filler, 0.1-0.5 wt % of an antioxidant, 0.1-1 wt % of a processing aid, and 0.5-2 wt % of a nucleating agent, and the total amount of all components is 100 wt %.

6 Claims, No Drawings

LOW SPECIFIC GRAVITY PET COMPOSITE MATERIAL

CROSS-REFERENCE TO RELATED PATENT APPLICATION

This application claims the benefit of priority to Taiwan Patent Application No. 108103610 filed on Jan. 30, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a PET composite material, and more particularly to a low specific gravity PET composite material suitable for manufacturing a tableware article which can be used in place of melamine tableware.

BACKGROUND OF THE DISCLOSURE

Melamine tableware are made with melamine-formaldehyde resin and may cause excessive migration of melamine and formaldehyde to foods at 40° C., which may harm human health.

PET (polyethylene terephthalate) is a non-toxic plastic and can be used at temperatures up to 140° C. PET containers are widely used in packaging for water and beverages. In addition, PBT (polybutylene terephthalate) has a fast crystallization rate to facilitate quick formation of a molded product. Furthermore, PBT has excellent heat resistance, chemical resistance and mechanical strength, and these properties are stable under a wide range of environmental conditions.

Therefore, a novel composite material having the advantages of PET and PBT is suitable for manufacturing tableware which can provide a balance between aesthetic appearance and food safety so as to be used in place of melamine tableware.

SUMMARY OF THE DISCLOSURE

In order to solve food safety problems of tableware, the present disclosure provides a low specific gravity PET composite material suitable for manufacturing a tableware article by injection molding. The PET composite material, based on the total weight of the PET composite material, includes the following components, the total amount of which is 100 wt %:
(a) 66.5-96.3 wt % of PET having a relative density of 1.35-1.40 g/cm$^3$, a melting point of 245-260° C. and an intrinsic viscosity (IV) of 0.65-0.9 dL/g;
(b) 0-20 wt % of PBT having a relative density of 1.30-1.35 g/cm$^3$, a melting point of 220-230° C. and an intrinsic viscosity (IV) of 0.85-1.2 dL/g;
(c) 3-10 wt % of an inorganic filler selected from at least one of barium sulfate, calcium silicate, calcium carbonate and talc, which is preferably a mixture of barium sulfate and calcium silicate mixed in a weight ratio from 1:0.25 to 1:1;
(d) 0.1-0.5 wt % of an antioxidant selected from at least one of pentaerythritol tetrakis(3-(3,5-di-tert-butyl-4-hydroxyphenyl)propionate), tris(2,4-di-tert-butylphenyl)phosphite and octadecyl 3-(3,5-di-tert-butyl-4-hydroxyphenyl)propionate;
(e) 0.1-1 wt % of a processing aid selected from at least one of ethylene bis stearamide (EBS), erucamide, polyethylene wax, paraffin wax, stearic acid, zinc stearate, calcium stearate and polydimethylsiloxane; and
(f) 0.5-2 wt % of a nucleating agent selected from at least one of a long-chain linear saturated sodium carboxylate, a long-chain linear saturated calcium carboxylate and an aromatic sodium or magnesium carboxylate.

The advantages of the present disclosure include:
1. the low specific gravity PET composite material is suitable for manufacturing, by injection molding, a tableware article, which provides a balance between aesthetic appearance and food safety, and especially can be used in place of melamine tableware; and
2. the resulting tableware such as bowls, plates, spoons and chopsticks have both a ceramic-like glossy appearance and excellent drop resistance, and will not easily break while in use.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A low specific gravity PET composite material of the present disclosure is suitable for manufacturing, by injection molding, a tableware article, which provides a balance between aesthetic appearance and food safety. The PET composite material, based on the total weight of the PET composite material, includes the following components, the total amount of which is 100 wt %:
(a) 66.5-96.3 wt % of PET;
(b) 0-20 wt % of PBT;
(c) 3-10 wt % of an inorganic filler;
(d) 0.1-0.5 wt % of an antioxidant;
(e) 0.1-1 wt % of a processing aid; and
(f) 0.5-2 wt % of a nucleating agent.

PET provides good performances in terms of mechanical strength and temperature resistance. PBT serves as an auxiliary component to improve an injection molding effect and fluidity of the composite material.

PET of the present disclosure has a relative density of 1.35-1.40 g/cm$^3$, a melting point of 245-260° C. and an intrinsic viscosity of 0.65-0.9 dL/g. PBT of the present disclosure has a relative density of 1.30-1.35 g/cm$^3$, a melting point of 220-230° C. and an intrinsic viscosity of 0.85-1.2 dL/g.

The inorganic filler is added to increase mechanical properties, heat resistance, warpage resistance and surface gloss of the composite material. The inorganic filler of the present disclosure is selected from at least one of barium sulfate, calcium silicate, calcium carbonate and talc, and is preferably a mixture of barium sulfate and calcium silicate which are mixed in a weight ratio from 1:0.25 to 1:1.

The antioxidant is added to prevent the composite material from being oxidized during processing. The processing aid is added to reduce friction among materials and equipment, so that the composite material can be easily processed and uniformly distributed. The antioxidant is selected from at least one of pentaerythritol tetrakis(3-(3,5-di-tert-butyl-4-hydroxyphenyl)propionate), tris(2,4-di-tert-butylphenyl) phosphite and octadecyl 3-(3,5-di-tert-butyl-4-hydroxyphenyl)propionate. Examples of commercially available antioxidants include Irganox® 1010, Irganox® 168, Irganox® 1076 and PW-9225.

The nucleating agent is added to improve and increase a crystallization effect and crystallization speed of PET and increase the heat resistance of the composite material. The nucleating agent of the present disclosure is selected from at least one of a long-chain linear saturated sodium carboxylate, a long-chain linear saturated calcium carboxylate and an aromatic sodium or magnesium carboxylate.

The processing aid of the present disclosure at least one selected from ethylene bis stearamide (EBS), erucamide, polyethylene wax, paraffin wax, stearic acid, zinc stearate, calcium stearate and polydimethylsiloxane.

Examples 1-4 and Comparative Examples 1-3 are used to more specifically illustrate the present disclosure and its advantages without limiting the scope of the present disclosure. The physical properties shown in Examples 1-4 and Comparative Examples 1-3 were evaluated by the following methods.

1. Tensile strength (MPa) was measured in accordance with ASTM D638 standard at a stretch speed of 50 mm/min. The sample size used for measurement was 165±2 mm×19±0.2 mm×3.2±0 2 mm 2. Flexural strength (MPa) was measured in accordance with ASTM D790 standard at a bending speed of 13 mm/min. The sample size used for measurement was 127±2 mm×12.7±0.2 mm×3.2±0.2 mm.

3. Flexural modulus (MPa) was measured in accordance with ASTM D790 standard at a bending speed of 13 mm/min. The sample size used for measurement was 127±2 mm×12.7±0.2 mm×3.2±0.2 mm.

4. Izod impact strength (Kg-cm/cm) was measured in accordance with ASTM D256 standard. For measurement, the sample size is 63.5±2 mm×12.7±0.2 mm×3.2±0.2 mm, the notch angle was 45±1°, the notch radius was 0.25±0.12 mm, and the notch depth was 10.16±0.05 mm.

5. Heat distortion temperature was measured in accordance with ASTM D648 standard at a heating rate of 120° C./hr and a pressure of 1.82 MPa (4.6 kg/cm$^2$). For measurement, the sample size used was 127±2 mm×12.7±0.2 mm×3.2±0.2 mm, and a distortion value is 0.254 mm.

Example 1

The low specific gravity PET composite material of Example 1 shown in Table 1 includes 96.2 wt % of PET, 3 wt % of barium sulfate, 0.1 wt % of an antioxidant, 0.2 wt % of a processing aid and 0.5 wt % of a nucleating agent.

The low specific gravity PET composite material after being extruded, by a twin-screw extruder, granulated and dried was used to manufacture a tableware article by injection molding at a molding temperature of 80-100° C. The physical properties of the tableware article were measured at room temperature and the results are shown in Table 1.

Example 2

The manufacturing method is the same as Example 1. The low specific gravity PET composite material of Example 2 shown in Table 1 includes 87.2 wt % of PET, 5 wt % of PBT, 3 wt % of barium sulfate, 3 wt % of calcium silicate, 0.3 wt % of an antioxidant, 0.5 wt % of a processing aid and 1 wt % of a nucleating agent. The physical properties of the resulting tableware article were measured at room temperature and the results are shown in Table 1.

Example 3

The manufacturing method is the same as Example 1. The low specific gravity PET composite material of Example 3 shown in Table 1 includes 79.3 wt % of PET, 10 wt % of PBT, 6 wt % of barium sulfate, 2 wt % of calcium silicate, 0.4 wt % of an antioxidant, 0.8 wt % of a processing aid and 1.5 wt % of a nucleating agent. The physical properties of the resulting tableware article were measured at room temperature and the results are shown in Table 1.

Example 4

The manufacturing method is the same as Example 1. The low specific gravity PET composite material of Example 4 shown in Table 1 includes 66.5 wt % of PET, 20 wt % of PBT, 6 wt % of barium sulfate, 4 wt % of calcium silicate, 0.5 wt % of an antioxidant, 1 wt % of a processing aid and 2 wt % of a nucleating agent. The physical properties of the resulting tableware article were measured at room temperature and the results are shown in Table 1.

Comparative Example 1

The manufacturing method is the same as Example 1. The low specific gravity PET composite material of Comparative Example 1 shown in Table 1 includes 81.6 wt % of PET, 10 wt % of PBT, 6 wt % of barium sulfate, 2 wt % of calcium silicate and 0.3 wt % of an antioxidant. The physical properties of the resulting tableware article were measured at room temperature and the results are shown in Table 1.

Comparative Example 2

The manufacturing method is the same as Example 1. The low specific gravity PET composite material of Comparative Example 2 shown in Table 1 includes 79.3 wt % of PET, 10 wt % of PBT, 2 wt % of calcium silicate, 6 wt % of calcium carbonate, 0.4 wt % of an antioxidant, 0.8 wt % of a processing aid and 1.5 wt % of a nucleating agent. The physical properties of the resulting tableware article were measured at room temperature and the results are shown in Table 1.

Comparative Example 3

The manufacturing method is the same as Example 1. The low specific gravity PET composite material of Comparative Example 3 shown in Table 1 includes 79.3 wt % of PET, 10 wt % of PBT, 2 wt % of calcium silicate, 6 wt % of talc, 0.4 wt % of an antioxidant, 0.8 wt % of a processing aid and 1.5 wt % of a nucleating agent. The physical properties of the resulting tableware article were measured at room temperature and the results are shown in Table 1.

Results

The PET composite materials of Examples 1-4 are suitable for manufacturing tableware by injection molding. Tableware resulting from the PET composite materials of Examples 1-4 not only have improved mechanical properties and heat resistance, but also have higher surface gloss than tableware resulting from the PET composite materials of Comparative Examples 1-3.

The PET composite material of Example 3 additionally includes a processing aid and a nucleating agent so that it is suitable for manufacturing tableware by injection molding. The PET composite material of Comparative Example 1 does not include the processing aid and the nucleating agent, as a result, it is not suitable for manufacturing tableware by injection molding.

The PET composite materials of Example 3 and Comparative Examples 2 and 3 use different inorganic fillers. The inorganic filler of the PET composite material of Example 3 is a mixture of barium sulfate and calcium silicate mixed in a weight ratio of 3:1. The inorganic filler of the PET composite material of Comparative Example 2 is a mixture of calcium silicate and calcium carbonate mixed in a weight ratio of 1:3. The inorganic filler of the PET composite material of Comparative Example 3 is a mixture of calcium silicate and talc mixed in a weight ratio of 1:3. It is observed that the PET composite material of Example 3 is suitable for manufacturing tableware having better surface gloss and Izod impact strength (KJ/m$^2$) by injection molding.

Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A low specific gravity PET composite material for manufacturing a tableware article, it is characterized in that, based on the total weight of the PET composite material, the PET composite material comprises:
   (a) 79.3-87.2 wt % of PET having a relative density of 1.35-1.40 g/cm$^3$, a melting point of 245-260° C. and an intrinsic viscosity of 0.65-0.9 dL/g;
   (b) 5-10 wt % of PBT having a relative density of 1.30-1.35 g/cm$^3$, a melting point of 220-230° C. and an intrinsic viscosity of 0.85-1.2 dL/g;
   (c) 3-10 wt % of an inorganic filler;
   (d) 0.1-0.5 wt % of an antioxidant;
   (e) 0.1-1 wt % of a processing aid; and
   (f) 0.5-2 wt % of a nucleating agent,
   wherein, after the low specific gravity PET composite material is extruded by a twin-screw extruder, granulated and dried, the low specific gravity PET composite material is suitable to be used to manufacture a tableware article by injection molding at a molding temperature of 80-100° C.

2. The low specific gravity PET composite material according to claim 1, wherein the inorganic filler is selected from at least one of barium sulfate, talc, calcium carbonate and calcium silicate.

3. The low specific gravity PET composite material according to claim 2, wherein the inorganic filler is a mixture

TABLE 1

| Components (wt %) | | Examples | | | | Comparative Examples | | |
| --- | --- | --- | --- | --- | --- | --- | --- | --- |
| | | 1 | 2 | 3 | 4 | 1 | 2 | 3 |
| PET | | 96.2 | 87.2 | 79.3 | 66.5 | 81.6 | 79.3 | 79.3 |
| PBT | | 0 | 5 | 10 | 20 | 10 | 10 | 10 |
| Inorganic filler | Barium sulfate | 3 | 3 | 6 | 6 | 6 | — | — |
| | Calcium silicate | 0 | 3 | 2 | 4 | 2 | 2 | 2 |
| | Calcium carbonate | — | — | — | — | — | 6 | — |
| | Talc | — | — | — | — | — | — | 6 |
| Antioxidant | | 0.1 | 0.3 | 0.4 | 0.5 | 0.4 | 0.4 | 0.4 |
| Processing aid | | 0.2 | 0.5 | 0.8 | 1.0 | — | 0.8 | 0.8 |
| Nucleating agent | | 0.5 | 1 | 1.5 | 2 | — | 1.5 | 1.5 |
| Izod impact strength (KJ/m$^2$) | | 3.6 | 3.9 | 4.1 | 4.5 | 3.9 | 3.8 | 3.7 |
| Tensile strength (MPa) | | 58.5 | 55.6 | 53.6 | 51.8 | 55.1 | 54.7 | 49.4 |
| Flexural strength (MPa) | | 82.3 | 86.7 | 88.0 | 92.8 | 87.2 | 90.2 | 86.6 |
| Flexural modulus (MPa) | | 2488 | 2549 | 2621 | 2670 | 2608 | 2701 | 2834 |
| Heat distortion temperature (° C.) | | 73 | 77 | 84 | 94 | 79 | 82 | 92 |
| Specific gravity | | 1.346 | 1.373 | 1.398 | 1.420 | 1.396 | 1.392 | 1.388 |
| Injection moldability | | Fair | Fair | Good | Good | Poor | Fair | Fair |
| Surface gloss | | Fair | Fair | Good | Good | Poor | Fair | Fair |

The foregoing description of the exemplary embodiments of the disclosure has been presented only for the purposes of illustration and description and is not intended to be exhaustive or to limit the disclosure to the precise forms disclosed.

of barium sulfate and calcium silicate which are mixed in a weight ratio from 1:0.25 to 1:1.

4. The low specific gravity PET composite material according to claim 1, wherein the antioxidant is selected from at least one of pentaerythritol tetrakis(3-(3,5-di-tert-butyl-4-hydroxyphenyl)propionate), tris(2,4-di-tert-butylphenyl)phosphite and octadecyl 3-(3,5-di-tert-butyl-4-hydroxyphenyl)propionate.

5. The low specific gravity PET composite material according to claim 1, wherein the processing aid is selected from at least one of ethylene bis stearamide (EBS), erucamide, polyethylene wax, paraffin wax, stearic acid, zinc stearate, calcium stearate and polydimethylsiloxane.

6. The low specific gravity PET composite material according to claim 1, wherein the nucleating agent is selected from at least one of a long-chain linear saturated sodium carboxylate, a long-chain linear saturated calcium carboxylate and an aromatic sodium or magnesium carboxylate.

* * * * *